US005329767A

United States Patent [19]

Hewett

[11] Patent Number: 5,329,767

[45] Date of Patent: Jul. 19, 1994

[54] HYDRAULIC CIRCUIT FLOW CONTROL

[75] Inventor: Allan J. Hewett, Vancouver, Canada

[73] Assignee: The University of British Columbia, Vancouver, Canada

[21] Appl. No.: 6,584

[22] Filed: Jan. 21, 1993

[51] Int. Cl.[5] .......... F16D 31/02; F15B 11/08; F15B 13/04

[52] U.S. Cl. .......... 60/475; 60/414; 91/463

[58] Field of Search .......... 60/414, 473, 475, 476; 91/451, 452, 462, 463, 465, 466

[56] References Cited

U.S. PATENT DOCUMENTS

| | | | |
|---|---|---|---|
| 3,971,215 | 7/1976 | Baron et al. | 60/414 X |
| 4,342,164 | 8/1982 | Claassen | 60/476 X |
| 4,359,931 | 11/1982 | Palmersheim et al. | |
| 4,715,180 | 12/1987 | Rosman | 60/414 X |
| 4,738,101 | 4/1988 | Kubik | |
| 4,913,616 | 4/1990 | Dunn | |
| 4,961,316 | 10/1990 | Corke et al. | 60/475 X |
| 5,179,836 | 1/1993 | Dantlgraber | 60/414 X |

*Primary Examiner*—Edward K. Look
*Assistant Examiner*—John Ryznic
*Attorney, Agent, or Firm*—C. A. Rowley

[57] ABSTRACT

A hydraulic system incorporating a double acting piston and cylinder and a bi-directional pump/motor derives energy from a drive system when operating in the pump mode and delivers energy to the drive system when in the pump mode and includes a circulation valve for supplementing fluid flow to and from and fluid supply in accordance with the unequal demands of the chambers driving the hydraulic actuator in one direction or the other by circulating fluid between the chambers.

4 Claims, 2 Drawing Sheets

HYDRAULIC CIRCUIT FLOW CONTROL

FIELD OF THE INVENTION

The present invention relates to a hydraulic circuit for a double acting piston and cylinder. More particularly the present invention relates to a hydraulic circuit permitting direct flow of the required amount of hydraulic fluid from a first chamber at one end of the double acting hydraulic cylinder to a second chamber at the other end and vice versa.

BACKGROUND OF THE PRESENT INVENTION

The concept of regenerated flow of hydraulic fluid from one end of the hydraulic cylinder back to the other end of the hydraulic cylinder is known. The systems are generally provided to combat excessive movement of the piston in one direction as sometimes occurs under load conditions where gravity is assisting movement. Under such circumstances, the flow requirements may be beyond the capacity of the flow delivery means such as the pump which may result in cavitation or the induction of air somehow into the hydraulic system which will then render the system ineffective.

One system that purports to overcome the above problem is described in U.S. Pat. No. 4,913,616 issued Apr. 3, 1990 to Dunn. The particular system described in this patent relates to a control for bucket movement in an excavator wherein dumping of a loaded bucket requires excessively fast flow to one end of the hydraulic cylinder (one side of the piston) and the control for initiating the dumping action causes restriction of the flow from the other end of the cylinder (other side of the piston) back to the reservoir which results in an increase in the pressure from the other end of the cylinder thereby slowing movement but when the pressure exceeds a preset pressure a check valve is opened to permit flow from the other cylinder end (the out flowing end of the cylinder) to the inflowing end of the cylinder and thereby supplement the flow of fluid into the inflowing end of the cylinder.

The concept of using squash plates or the like to pump hydraulic fluid in one direction or the other direction in a hydraulic circuit is well known.

It has also been suggested with double acting hydraulic systems having fluid chambers with the same effective cross sectional areas so that the amount of fluid entering one of the double acting cylinders is equal to the amount of fluid leaving the other cylinder to use a pump to increase the pressure as required when the fluid is moved from one of the double acting cylinders to the other. During movement of the piston of the double acting system one of the chambers functions as a source and the other as the receiving chamber or vice versa without any imbalance in the system. Such an arrangement is shown in U.S. Pat. No. 4,738,101 issued Apr. 19, 1988 to Kubik.

U.S. Pat. No. 4,359,931 issued Nov. 23, 1982 to Palmershein et al discloses a double acting piston and cylinder wherein flow from the smaller cross sectional area side of a piston (i.e. piston rod side) is directed to the opposite side of the piston when the piston is to be extended.

BRIEF DESCRIPTION OF THE PRESENT INVENTION

It is an object of the present invention to provide a hydraulic system wherein recirculation of fluid from two chambers of different cross sections can be directed from one cylinder to the other and the flow supplemented as required to obtain the required flow to each of the cylinders.

It is another object of the present invention to provide a system wherein a pump/motor acts to supply energy to a drive system when the pump/motor is operating in the motor mode and to use energy from the drive system when operating in the pump mode.

Broadly the present invention relates to a hydraulic system comprising a double acting hydraulic piston cylinder having a first cylinder means on one side of said piston and a second cylinder means on the side of said piston opposite said first cylinder means, a bi-directional fluid pump/motor means having a first inlet/outlet connection and a second inlet/outlet connection, first connecting means connecting said first inlet/outlet connection to said first cylinder means, a second connecting means connecting said second inlet/outlet connection to said second cylinder means, a drive system connected to said pump/motor to supply energy to said pump/motor when said pump/motor is operating in a pumping mode moving fluid from a side of said double acting cylinder at a lower pressure to a side of said double acting cylinder at a higher pressure and to receive energy from said pump/motor when said pump/motor is operating in a motor mode when fluid is being directed from a higher pressure side of said double acting cylinder to a lower pressure side of said double acting cylinder.

Broadly the present invention also relates to a hydraulic system comprising a double acting hydraulic piston cylinder having a first cylinder means on one side of said piston and a second cylinder means on the side of said piston opposite said first cylinder means, a bi-directional fluid pump/motor means having a first inlet/outlet connection and a second inlet/outlet connection, first connecting means connecting said first inlet/outlet connection to said first cylinder means, a second connecting means connecting said second inlet/outlet connection to said second cylinder means, a circulation valve, said first and said second connecting means connecting their respective of said inlet/oulet connections to said circulation valve, a fluid supply system, third connecting means connecting said fluid supply system with said circulation valve, said circulation valve being adjustable to selectively direct flow between said first connecting means and said fluid supply means or between said second connecting means and said fluid supply system.

Preferably said first and said second cylinders have different effective cross sectional areas.

Preferably said third connecting means further includes a first conduit means and a second conduit means connecting said fluid supply system to said first connecting means and said second connecting means respectively, said first and said second conduit means each including a check valve permitting flow only in a direction from said fluid supply system.

BRIEF DESCRIPTION OF THE DRAWINGS

Further features, objects and advantages will be evident from the following detailed description of the preferred embodiments of the present invention taken in conjunction with the accompanying drawings in which.

DESCRIPTION OF THE PREFERRED EMBODIMENT

Figure 1:
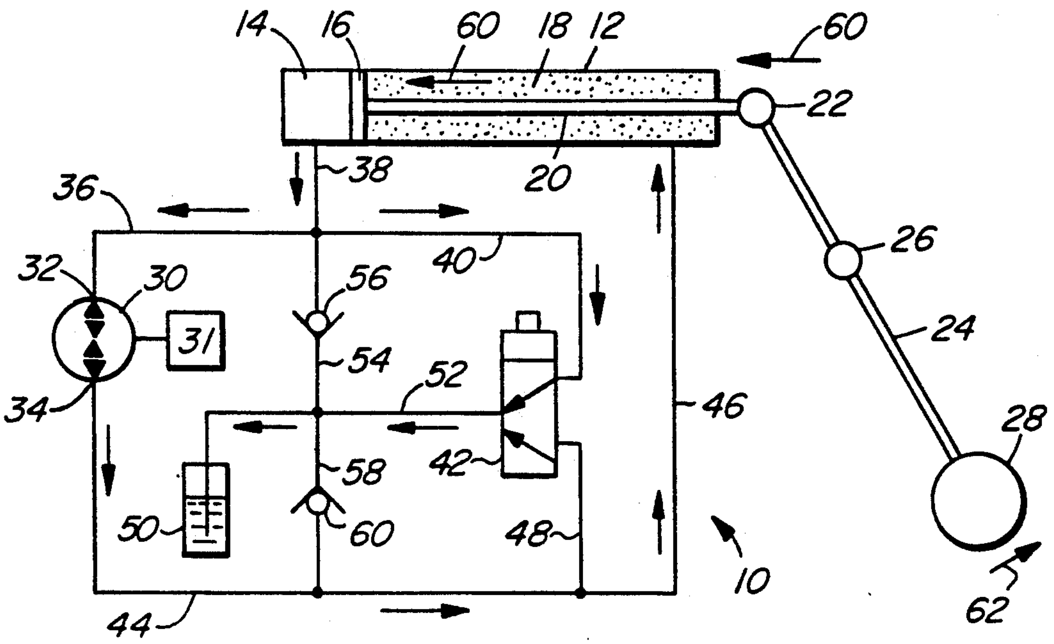
FIGS. 1, 2, 3 and 4 are each schematic representations of different actions of a double acting piston and cylinder showing the flow through the hydraulic system of the present invention.

Referring to FIG. 1, a hydraulic system 10 which is common to all of the figures is composed of a double acting cylinder 12 having a first or large chamber 14 at one side of the piston 16 and a second smaller effective cross sectional area cylinder 18 on the opposite side or rod side of the piston 16. The effective cross sectional area of the smaller cross section cylinder 18 is reduced relative to that of the larger effective area chamber 14 by the cross sectional area of the rod 20.

In the illustrated arrangement the free end of the piston rod 20 is pivotally connected as indicated at 22 to one end of a simple lever 24 that is pivoted at 26 and carries at its end remote from the end 22 a load 28.

The hydraulic circuit 10 includes a bi-directional pump/motor 30 having a first inlet/outlet connection 32, a second inlet/outlet connection 34. The inlet/outlet 32 is connected to a first connecting means that includes lines 36 and 38 leading to the cylinder 14 and line 40 leading to the circulation valve 42 which is a two position valve that operates as will be described hereinbelow. The pump/motor 30 is coupled to a drive system 31 (schematically illustrated only in FIGS. 1 and 3) from which the pump/motor 30 derives energy when operating in the pumping mode and to which the pump/motor delivers energy when in operating in the motor mode. It will be apparent that if the drive system 31 has a number of pump/motors 30 coupled to the same prime mover that at any one time some of the pump/motors 30 may be in the pumping mode while others are in the motor mode so that those in the motor mode will tend to provide the energy necessary to drive the pump/motors 30 that are at that time in the pump mode and thereby reduce the energy that must be supplied by the prime mover.

The second inlet/outlet connector 34 is connected via a second connecting means that includes lines 44 and 46 to the chamber 18 and line 48 to the two position circulation valve 42.

The two position circulation valve 42 is connected to the hydraulic fluid supply system 50 via a connecting line 52 forming part of a third connecting means that also includes a conduit 54 with a check valve 56 connecting the fluid supply system 50 with the line 36 and conduit 58 with check valve 60 connecting the fluid supply 50 to line 44. The check valves 56 and 60 permit flow from the fluid supply system 50 to the line 36 and 44 respectively but prevent flow in the opposite direction.

The operation of the system will now be described with respect to four different operations as indicated in FIGS. 1, 2, 3 and 4 respectively.

In FIG. 1, the piston 16 is moving to the left as indicated by the arrow 60 which tends to move the load up as indicated by the arrow 62. This requires flow of fluid from the first cylinder 14 into the second cylinder 18. The flow of fluid into or out of the cylinder 14 for a any movement of the piston 16 must be greater than the flow out of or into the cylinder 18. Thus the flow out of the cylinder 14 in FIG. 1 is more than that required to fill cylinder 18 and move the piston 16 to the left and for this mode of operation there is a net flow of fluid available from the cylinder 14 over that required in the cylinder 18 and thus some of this flow must be diverted to the fluid supply system 50. This is accomplished via the circulation valve 42 which during this operation is set to connect the line 40 with the line 52.

Thus operation of the system illustrated in FIG. 1 bi-directional pump/motor 30 must be pumping to apply energy to lift the load 28 and is drawing fluid from the chamber 14 via lines 38 and 36 and pumping via lines 44 and 46 to the chamber 18 which as indicated by the dots is at a higher pressure than cylinder 14. Obviously movement of the piston 16 in accordance with the amount of fluid entering the chamber 18 results in more fluid being forced from the chamber 14 than is required in cylinder 18. This extra fluid is diverted along line 40 through the valve 42 and back to the fluid supply system 50 via line 52. There is no flow through either of the lines 54 or 58 as the pressure in lines 36 and 44 is higher than the pressure in the line 52.

In the FIG. 1 arrangement the pump/motor 30 is functioning as a pump moving fluid to the side of the double acting cylinder 12 at the higher pressure from the side at the lower pressure and the drive system 31 supplies energy to the pump/motor 30.

Figure 2:
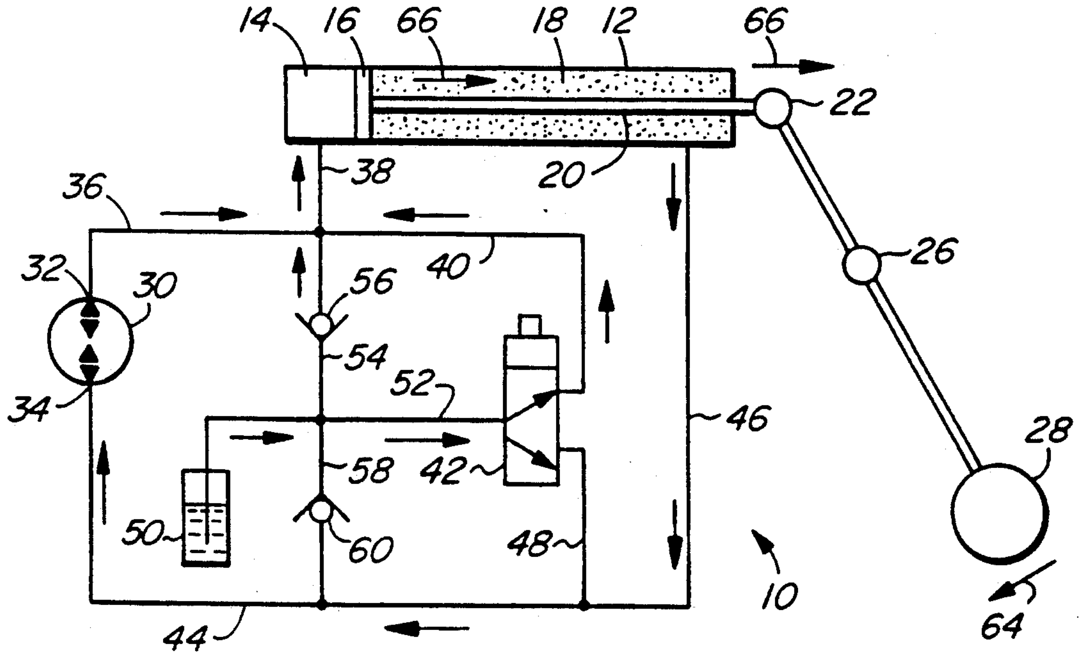

When it is desired to lower the load 28 as indicated by the arrow 64 in FIG. 2, piston 16 is moved to the right as indicated by the arrow 66. In this case the load 28 provides the driving force forcing fluid from the cylinder 18 which remains the high pressure side of the double acting piston and cylinder 12. In this case fluid is driven from the chamber 18 and flows via line 46 and 44 and through the bi-directional pump/motor 30 which is now functioning as a motor being driven by the flow of fluid from the chamber 18 induced by the weight of the load 28 moving the piston 16 to the right.

In the FIG. 2 arrangement the pump/motor 30 is acting in the motor mode directing fluid from the high pressure side of the double acting cylinder 12 to the low pressure side and the pump/motor 30 is supplying energy back to the drive system 31.

A reduced pressure is generated in the cylinder 14 with the tendency of the piston 16 to move to the right thereby drawing fluid from the bi-directional pump/motor 30 through line 36 and into the cylinder 14. The total available fluid from chamber 18 passing through the bi-directional pump/motor 30 is not sufficient to meet the requirements of the chamber 14 and thus must be supplemented. This is obtained by flow in the opposite direction to that shown in FIG. 1 through the lines 52 and 40 and by flow through the line 54 and check valve 56 to the line 38 for entry into the cylinder 14.

It will be noted that the circulation valve 42 is in the same position when the load is being lifted in FIG. 1 or when it is being lowered by gravity in FIG. 2 i.e. when the cylinder 18 is at the higher pressure.

Figure 3:
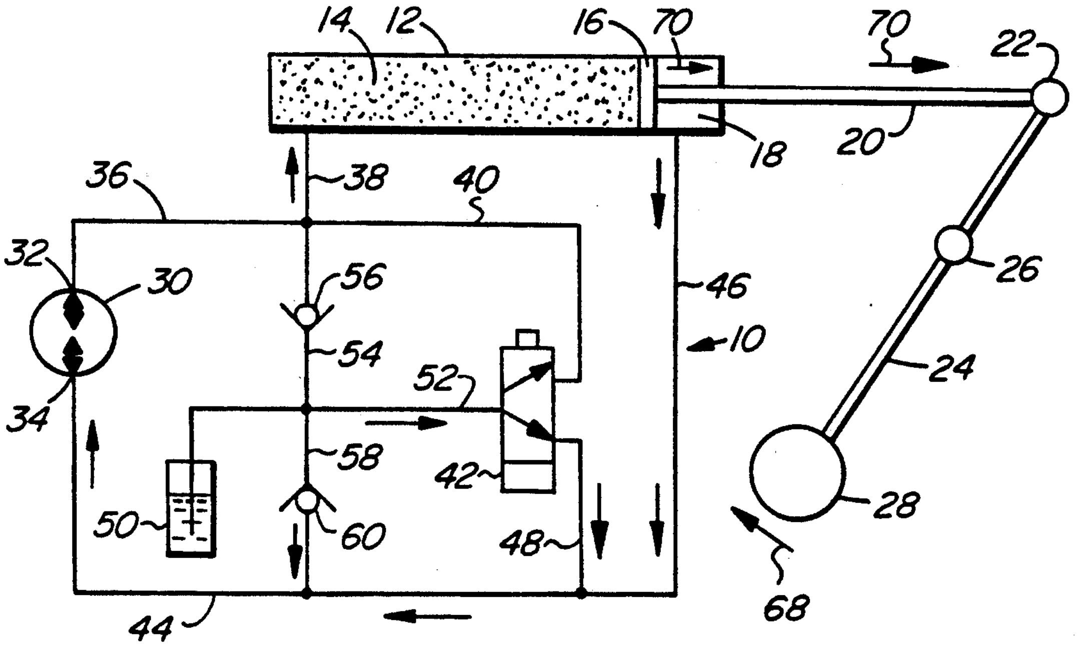
Figure 4:
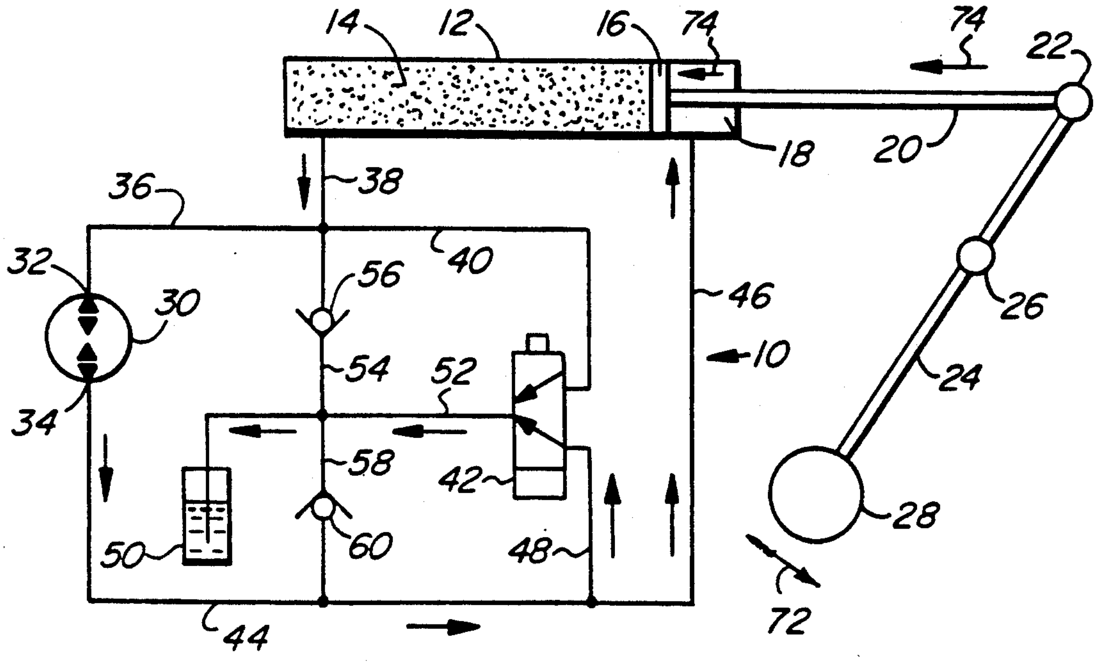

FIGS. 3 and 4 illustrate the reverse operation when the load is on the opposite side of the pivot 26 and normally a higher pressure is required in the chamber 14 and a lower pressure in the chamber 18.

Under these conditions when the load is to be lifted as shown in FIG. 3, i.e. the load 28 is to moved in the direction indicated by the arrow 68, the piston 16 and the rod 20 are moved in the direction of the arrow 70 by applying the high pressure fluid to the chamber 14. With this arrangement the pump/motor 30 is functioning as a pump drawing fluid available from the cylinder 18 with the remainder being drawn from the fluid supply 50 and using energy supplied by the drive system 31. It will be apparent that the valve 42 is now in its second position interconnecting line 48 with the line 52 and disconnecting the line 40. Line 44 is now on the suction side of the pump/motor 30 and thus the line 44 is at a lower pressure than line 52 inducing flow through the check valve 60 and through the valve 42 to supplement the flow in lines 44 and 46.

In the arrangement shown in FIG. 4 the load 28 is now being lowered as indicated by the arrow 72 so that the weight of the load 28 now functions as a driving force and tends to move the piston 16 and piston rod 20 in the direction of the arrow 74 as the load 28 moves in the direction of the arrow 72. Thus there is a net force driving the piston 16 to the left and forcing fluid out of the chamber 14 which normally will be the high pressure chamber.

The high pressure fluid from the chamber 14 passes via line 38, the bi-directional pump/motor 30 which is functioning as a motor, through line 44 to line 46 and the chamber 18 but as the chamber 14 that is significantly larger than chamber 18 there is an excess of fluid flow and this excess fluid is directed via line 48 to valve 42 and line 52 to the fluid supply 50 to retain the system hydraulically in balance.

It will be noted that when the cylinder 14 is under high pressure the valve 42 interconnects the lines 48 and 52 whereas when the chamber 18 is at the higher pressure, the valve 42 connects the lines 40 and 52.

The use of the check valve 56 and 60 in lines 54 and 58 is simply to supplement the flow passing through the valve 42 when required.

Generally when the flow is from the high pressure side of the double acting cylinder 12 to the low pressure side the pump/motor 30 functions as a motor, however if the operator demands a rate of movement of the fluid faster than that available based on the pressure difference across the double acting cylinder 12 it may still be necessary for the pump/motor 30 to function as a pump to obtain the require rate of fluid flow.

Having described the invention, modifications will be evident without departing from the spirit of the invention as defined in the appended claims.

I claim:

1. A hydraulic system comprising a double acting hydraulic piston cylinder having a first cylinder means acting under fluid pressure to move said piston in a first direction and a second cylinder means acting under fluid pressure to move said piston in a second direction different from said first direction, said first cylinder means and said second cylinder means having significantly different effective cross sectional areas, a bi-directional fluid pump/motor means having a first inlet/outlet connection and a second inlet/outlet connection, first connecting means connecting said first inlet/outlet connection to said first cylinder means, a second connecting means connecting said second inlet/outlet connection to said second cylinder means, a drive system connected to said pump/motor to supply energy to said pump/motor when said pump/motor is operating in a pumping mode moving fluid from one of said first and second cylinder means at a lower pressure to the other of said first and second cylinder means at a pressure higher than said lower pressure and to receive energy from said pump/motor when said pump/motor is operating in a motor mode when fluid is being directed from said other cylinder to said one cylinder, a two position circulation valve, said first and said second connecting means connecting their respective of said inlet/outlet connections to said circulation valve, a reservoir, a third connecting means connecting said reservoir with said circulation valve, said circulation valve being moveable between a first position directing flow of fluid between said first connecting means and said third connecting means when fluid pressure in said first cylinder means is higher than said fluid pressure in said second cylinder means and a second position directing flow of fluid between said second connecting means and said third connecting means when said fluid pressure in said second cylinder means is higher than said fluid pressure in said first cylinder means.

2. A hydraulic system as defined in claim 1 wherein said third connecting means further includes a first conduit means and a second conduit means connecting said reservoir to said first connecting means and said second connecting means respectively, said first and said second conduit means each including a check valve permitting flow only in a direction from said reservoir.

3. A double acting hydraulic system comprising a piston and cylinder having a first cylinder means acting under fluid pressure to move said piston in a first direction and a second cylinder means acting under fluid pressure to move said piston in a second direction different from said first direction, said first cylinder means and said second cylinder means having significantly different effective cross sectional areas, a bi-directional fluid pump/motor means having a first inlet/outlet connection and a second inlet/outlet connection, first connecting means connecting said first inlet/outlet connection to said first cylinder means, a second connecting means connecting said second inlet/outlet connection to said second cylinder means, a two position circulation valve, said first and said second connecting means connecting their respective of said inlet/outlet connections to said circulation valve, a reservoir, a third connecting means connecting said reservoir with said circulation valve, said circulation valve being moveable between a first position directing flow between said first connecting means and said reservoir when said fluid pressure in said first cylinder means is higher than said fluid pressure in said second cylinder means and a second position directing flow between said second connecting means and said reservoir when said fluid pressure in said second cylinder means is higher than said fluid pressure in said first cylinder means.

4. A hydraulic system as defined in claim 3 wherein said third connecting means further includes a first conduit means and a second conduit means connecting said reservoir to said first connecting means and said second connecting means respectively, said first and said second conduit means each including a check valve permitting flow only in a direction from said reservoir.

* * * * *